2,216,182

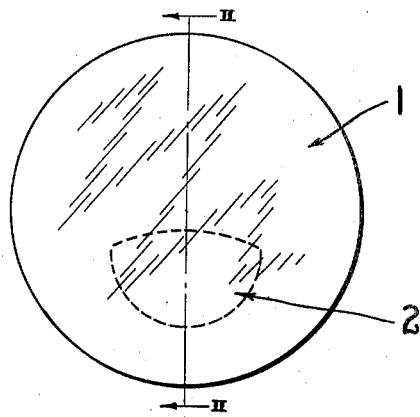
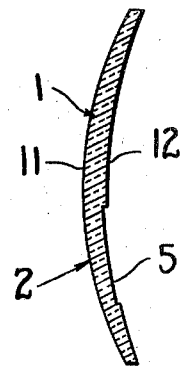
Fig. I  Fig. II
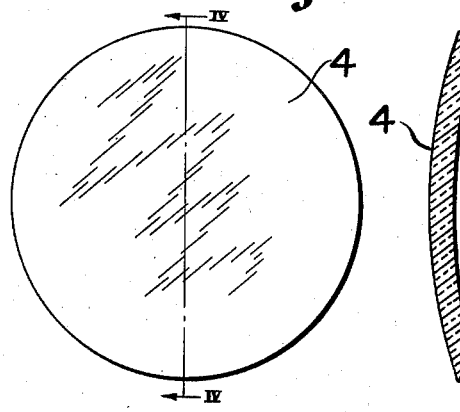
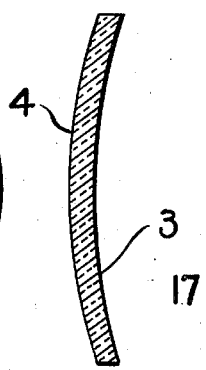
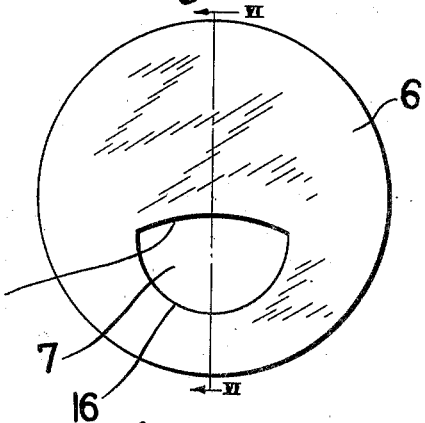
Fig. III  Fig. IV  Fig. V
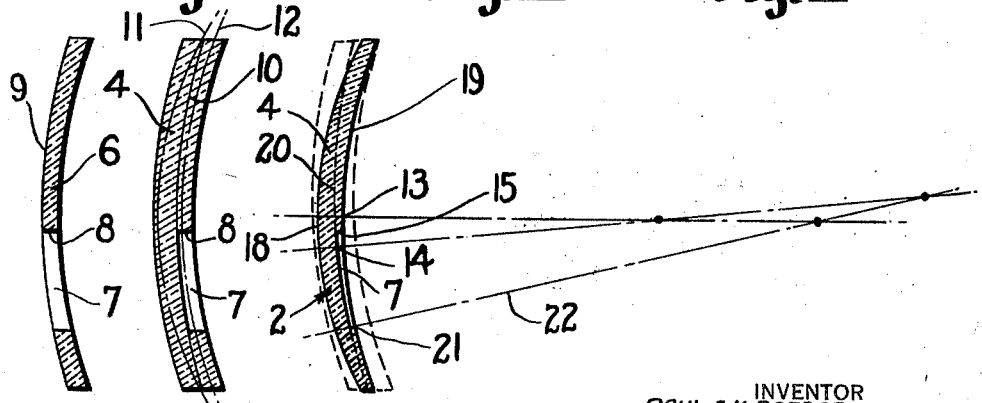
Fig. VI  Fig. VII  Fig. VIII
INVENTOR
PAUL A. K. BOEDER, HARRY W. HILL,
EDGAR D. TILLYER.
BY Harry H. Stull
ATTORNEY Patented Oct. 1, 1940

UNITED STATES PATENT OFFICE 2,216,182

OPHTHALMIC LENS

Paul A. K. Boeder, Harry W. Hill, and Edgar D. Tillyer, Southbridge, Mass., assignors to American Optical Company, Southbridge, Mass., a voluntary association of Massachusetts Application November 1, 1937, Serial No. 172,234

2 Claims. (Cl. 88—54)

This invention relates to improvements in ophthalmic lenses and has particular reference to an improved multifocal lens and method of making the same.

One of the principal objects of the invention is to provide an improved multifocal lens and method of making the same whereby the different focal fields of the lens may be separately provided with the desired prism or cylindrical power and with the axes of said prisms or cylinders located in any desired meridian.

Another object of the invention is to provide an improved method of forming multifocal lenses of the above character whereby one of the focal fields of the resultant lens may have any desired contour shape.

Another object of the invention is to provide a multifocal lens having one of its focal fields formed of a single layer of lens medium and another focal field formed of two superimposed layers of lens medium.

Another object of the invention is to provide a lens of the above character with a portion controlling the focal power of one of its focal fields depressed relative to another of said focal fields.

Another object is to provide a multifocal lens wherein the positions of the optical centers of the different focal fields may be separately controlled.

Another object is to provide an improved multifocal lens and method of making the same wherein the power of addition will be more accurate.

Another object is to provide a multifocal lens which will be free from chromatic aberrations.

Another object is to provide a fused type multifocal lens which will be absolutely immune to tarnish such as occurs in fused multifocal lenses using either flint or barium crown glasses.

Another object is to provide a multifocal lens wherein the same glass is used for the different focal fields.

Another object is to provide a multifocal lens wherein the dimensional contours of the different focal fields may be varied relative to each other.

Other objects and advantages of the invention will become apparent from the following description taken in connection with the accompanying drawing. It will be apparent that many changes in the details of construction, arrangement of parts and steps of the process may be made without departing from the spirit of the invention as expressed in the accompanying claims. We, therefore, do not wish to be limited to the exact details of construction, arrangement of parts and steps of the process shown and described, as the preferred forms only have been given by way of illustration.

Referring to the drawing, Fig. I is a front elevation of a finished lens embodying the invention;

Fig. II is a sectional view of the lens shown in Fig. I taken as on line II—II;

Fig. III is a front elevation of a portion of the lens showing a step in the process of manufacture;

Fig. IV is a sectional view taken on line IV—IV of Fig. III;

Fig. V is an elevation of another portion of the lens illustrating another step in the process of manufacture;

Fig. VI is a sectional view taken on line VI—VI of Fig. V;

Fig. VII is a sectional view showing the portions of Figs. III and V in secured relation with each other and illustrating another step in the process of manufacture; and Fig. VIII is a sectional view of a modified form of the invention.

One of the major difficulties encountered in multifocal lenses of the type having a piece of glass of a different index of refraction fused in a countersink formed in the major portion of the lens was that a great amount of prism displacement was introduced when the eye moved from one focal field into the other. Many attempts have been made to develop a multifocal lens wherein the positions of the centers of the different focal fields could be controlled so as to eliminate the major portion of said prism displacement.

It has been found possible to make multifocal lenses with controlled centers but such lenses have, in most part, been very difficult and expensive to manufacture.

Other difficulties were that with most of the prior art methods of forming such lenses the optical characteristics of each focal field could not be separately controlled so as to introduce the same or different prismatic or cylindrical corrections. In many instances undesirable chromatic aberrations were introduced and the contour shapes of the different focal fields could not be separately controlled. With most of the prior art methods of forming lenses with controlled centers one or all of the above difficulties were encountered.

It, therefore, is one of the primary objects of the present invention to provide an improved multifocal lens and method of making the same wherein the centers of the different focal fields, prismatic powers and cylindrical powers of said focal fields may be separately controlled and most of the prior art difficulties such as the introductions of chromatic aberrations, difficulties of manufacture, excess thickness of the resultant lens, and other prior art difficulties will be obviated and the general cost or production greatly reduced.

Referring more particularly to the drawing wherein like characters of reference designate like parts throughout the several views, the lens embodying the invention in its finished form, has a major focal field 1 and minor focal field 2.

The lens is preferably formed by first forming an optical surface 3 on one side of a piece of lens medium 4, of a given index of refraction, to the curvature desired of the surface 5 of the minor focal field 2. Another piece of lens medium 6 is provided with an opening 7 having the contour shape 8 desired of the minor focal field 2. This piece of lens medium 6 is preferably of substantially the same index of refraction and has sensibly the same coefficient of expansion as the piece of lens medium 4 and is provided with a surface 9 substantially contrageneric to the surface 3 which is adapted to be fused or otherwise secured to said surface 3 as illustrated in Fig. VII. Due to the fact that the lens medium of the two pieces of glass 4 and 6 are of sensibly the same index of refraction, the fusion line 10 formed by the contiguous surfaces of the said joined pieces of lens medium will disappear.

The blank resulting from the fusing together of the two pieces of lens medium 4 and 6, is then provided with the desired front and rear optical surfaces 11 and 12 as illustrated by the dot and dash lines in Fig. VII.

The surface 11 may be preferably formed at the factory and the blank may be sold to the trade in semi-finished form in a manner similar to the usual ophthalmic lens blanks and the final prescriptive surface 12 may be formed thereon by the dispenser.

It is pointed out that with the above arrangement the surfaces 3, 11 and 12 may be spherical or cylindrical or of any curvatures desired and the curvature and axis thereof may be separately controlled, it being only necessary to provide a surface 9 on the piece of lens medium 6 substantially contrageneric to the surface 3. It will also be noted that the positions of the optical centers of the different focal fields of the lens may also be controlled and that the prism powers of the different focal fields and the axes of said prisms may be separately varied and controlled by tilting the axes to change the angle of the surfaces relative to each other. This will be described more in detail hereinafter.

Although only one contour shape 8 has been shown it is to be understood that this contour shape may be varied to provide any shape desired and the size of the minor field 2 may be varied by changing the size of the opening 7. This opening 7 may be formed by heating the layer of lens medium 6 and punching out or displacing a portion thereof to form the opening 7. The punch may be so designed as to provide the contour shape and size of opening desired. It is also to be understood that the opening 7 may be formed by molding or grinding or by any method known in the art. The contour edges of the opening 7 may be provided with a surface formed by grinding or sand blasting and may be rough or polished as desired.

The lens resulting from the optical surfaces 11 and 12 as illustrated in Figs. II and VII will have the optical centers of its different focal fields coincident. These centers may, however, be located at different positions, as illustrated in Fig. VIII, wherein the optical center of the distance field is located at 13 and the optical center of the reading field is located at 14. The optical centers 13 and 14 are preferably located on opposite sides of the dividing line 15 between the two focal fields and are respectively located at a distance approximately four millimeters from said line or a distance substantially equal to half the diameter of the pupil of the eye.

The method of obtaining the above result is substantially as follows:

The piece of lens medium 6 is first formed with an opening 7 having the desired contour shape 8, as shown in Figs. V and VI. This contour shape 8, in this particular instance, is circular throughout the lower portion thereof and has an up curved transversely extending upper portion 17 which forms the line of division between the two different focal fields of the finished lens. This opening, as stated above, may be formed by punching, grinding or molding and may be of any desired contour shape and size. The pieces of lens medium 4 and 6 are then provided with surfaces 3 and 9 substantially contrageneric and which are thereafter fused together as illustrated in Fig. VII. The desired position of the optical center 14 of the reading or minor field 2 is then located. The blank formed as shown in Fig. VII is then blocked on a suitable lens holder of a lens grinding machine so as to be supported on the holder with the center 14 axial with the axis of generation of the abrading tool of said grinding machine. This tool, in this particular instance, generates the front surface 18 on the blank at the proper angle relative to the contiguous fused surfaces 20 and causes the optical center of the reading field to be located at 14. The power desired of the minor or reading field 2 may be controlled by changing the curvature of the surfaces 3 and 9 within reasonable limits and by changing the curvature of the surface 18 according to the usual practice in the ophthalmic art. It is apparent that the center 14 may be shifted to one side or the other of the vertical meridian of the lens to introduce base-in or base-out prism or may be shifted up or down relative to the horizontal meridian of the lens by varying the base-up or base-down prism power of the reading field.

In general the surface 5 formed by the joining together of the surfaces 3 and 9 is spherical. If it is desired to introduce a cylindrical power in the reading field 2 but not in the distance field 1, the surface 11 as shown in Figs. II and VII or the surface designated 18 in Fig. VIII, is formed with a curve of the desired cylindrical power and with the axis of the cylinder in the desired meridian. This causes the cylindrical power of said curve to be introduced in both the distance field 1 and reading field 2. Keeping in mind then that it is desired to introduce this cylindrical power only in the reading field the surface 12 or 19, as the case may be, is then provided with a cylindrical surface complementary to the cylindrical surface 11 or 18 of such a nature as to neutralize the cylindrical effect of said surface 11 or 18 and introduce only the spherical power desired in said distance field 1.

If it is desired to introduce a cylindrical power only in the distance field 1 and in the reading field 2 the surface 12 or 19, as the case may be, is provided with the desired cylindrical curvature. The surface 11 or 18 in this instance is formed spherical. The reading field, due to the fact that the surface 5 formed by the spherical joined surfaces 3 and 9 is a sphere and that the surface 11 or 18, as the case may be, is spherical has no cylindrical power.

If it is desired to introduce the same cylindrical power in both the distance field 1 and reading field 2 the surface 11 or 18 is provided with the proper cylindrical curvature and the surface 12 or 19 is provided with a spherical curvature.

If it is desired to introduce a different cylindrical power in the distance field than in the reading field the surface 11 or 18 is provided with a cylindrical curvature of the power desired in the reading field, and the surface 12 or 19 is provided with a cylindrical curvature which is of such a nature as to alter the resultant cylindrical power of the distance field the amount of difference desired between said distance field and the reading field.

It is apparent that the optical center 13 of the distance field may be shifted as desired. It may be moved to one side or the other of the vertical meridian or up or down relative to the horizontal meridian of the lens to introduce prism base-in, out, up or down as desired. This is accomplished by shifting the angle of the surface 19 relative to the surface 18 in the usual manner known in the art.

The surfaces 18 and 19 are preferably ground and polished to the surface curvatures desired by suitable abrading machines and tools and by the use of suitable abrasives and polishing ingredients known in the art.

The lens described above is preferably formed of pieces of lens medium 4 and 6 of sensibly the same indices of refraction and preferably have substantially the same coefficients of expansion. The pieces of lens medium 4 and 6 may have the same melting points or one of said pieces may have a lower melting point than the other so that one of said pieces, during fusion, and in instances wherein the contiguous surfaces 3 and 9 are not truly contrageneric, may soften and adhere to the other surface and produce an accurate fusing. In this particular instance, the piece of lens medium 4 will have a higher melting point than the piece of lens medium 6 and the surface 3, which is a highly polished finished optical surface and which forms the inner surface of the reading field, will be the controlling surface. Fusion, therefore, will take place without softening and distorting the surface 3.

Although the lenses 4 and 6 are described above as having the same indices of refraction, in some instances it may be desirable to vary the indices. In this instance one of the layers may be of a higher index of refraction than the other and if it is desired to eliminate chromatic aberrations the reciprocal relative dispersions of the pieces of lens medium 4 and 6 may be balanced in a manner known in the art to eliminate such aberrations.

In instances wherein the different layers of glass 4 and 6 are of different indices of refraction care must be taken that in forming the front surface of the lens, such as shown at 18, said surface does not cut through one of the layers into the other. In some instances, of course, this difficulty can not be overcome and, of course, layers 4 and 6 of the same indices of refraction would have to be used. The only advantage in using lens medium of a higher index of refraction would be in lenses having a higher power reading field and by making the layer of a higher index of refraction, flatter and more desirable curves could be used.

With the arrangement such as shown in Fig. VIII the optical center of the reading addition will be located at 21, wherein the line 22 passing through the center of curvature of the surface 19 and the center of curvature of the surface 20 intersects the lens.

It is apparent that lens blanks having the desired intermediate surface 10 or 20 as the case may be, could be finished in a manner similar to lens blanks of the usual prior art type and that the outer surfaces 18 and 19 may be formed thereon by the dispensers to introduce the prescriptive characteristics desired. The blanks also may be sold in semi-finished form having one of the outer surfaces, preferably the surface 18, formed thereon at the factory and the said blanks may then be furnished to the trade who may thereafter form the opposed surface 19 thereon to complete the prescriptions.

It is to be understood that the lens are cut and edged to the desired shape by the usual prior art methods.

It is to be understood that the above lenses, although described as being designed for the correction of focal errors is readily adaptable to the correction of size, shape magnification errors of the eyes. With this type of lens the shape magnification of the different focal fields, as well as the focal powers and so forth of said fields, may be separately controlled. The shape magnification of said fields being introduced by the controlling of the curvature of front surface and thickness of said field and their distance from the eyes. In this particular instance it may be preferable to form the layer 4 with the opening 7 so that the depression, in the finished lens, will be on the front surface of the lens and will enable the controlling of the front surface curvatures of the different focal fields separately of each other.

The method of introducing the size shape magnification correction desired is disclosed in Edgar D. Tillyer's Patent No. 2,077,134 issued April 13, 1937.

It is also apparent that a lens having one focal field colored or possessing desired infra red or ultra-violet absorption properties and having the other focal field clear and transparent may be provided.

In this particular instance the layer 4 would be formed of clear transparent lens medium and the layer 6 would be formed of lens medium possessing the desired color and absorption properties, these properties being introduced by methods commonly known in the art.

If it should be desirable to have both focal fields possessing desired absorption properties the layer 4 may be provided with the desired color or absorption properties or both of said layers may possess said properties.

To reduce glare from the cliff edge of the depression the said edge may be provided with a ground or roughened gray surface such as results from sand blasting, or grinding, or may be acid treated or otherwise altered to reduce glare.

From the foregoing descriptions it will be seen that simple, efficient and economical means and methods have been provided for obtaining a lens having different focal fields wherein the optical characteristics and corrective values of said fields may be separately controlled. It is apparent that any desired type of optical surfaces may be formed on each of the different focal fields.

Having described our invention we claim:

1. A multifocal lens comprising a piece of lens medium having a given index of refraction, given coefficient of expansion and relatively high melting point and having a finished optical surface of a controlled curvature on one side thereof, said optical surface being controlled as to its curvature so as to produce in part the resultant focal power desired through one of the focal fields of the lens, a second piece of lens medium of sensibly the same index of refraction and sensibly the same coefficient of expansion as said first piece of lens medium but having a given lower melting point, said second piece of lens medium having an opening with a cliff-like wall of substantially uniform height extending entirely around it and a surface on one side thereof of a curvature substantially contrageneric to the finished optical surface on said first piece of lens medium and fused to said first piece of lens medium throughout said contrageneric surfaces so as to allow only the portion of the finished optical surface on said first piece of lens medium surrounded by the cliff-like wall of the opening in the second piece to remain exposed, a finished optical surface on the outer exposed side of said first piece of lens medium to a curvature which, when combined with the first optical surface on said piece of lens medium, will produce the optical characteristics desired through the portion of said piece of lens medium surrounded by the cliff-like wall and a finished optical surface on the outer exposed side of said second piece of lens medium which, when combined with the finished optical surface on the outer exposed side of said first piece of lens medium will produce the optical characteristics desired through the composite pieces of lens medium surrounding the portion contained within the cliff-like wall, the intermediate and exterior surfaces being curved in the same direction said composite pieces of lens medium being reduced in thickness by an amount to reduce the cliff-like wall to a substantially uniform minimum, the composite pieces varying in thickness in cross section, the thick portion of one overlying the thin portion of the other, whereby the optical center of the surrounded portion has the desired position.

2. A multifocal ophthalmic lens having a distance vision field and a near vision field, said lens comprising two blanks of glass of substantially the same refractive index secured together in superposed relation with the contacting surface of the front blank being polished, the outer surface of the front blank having an uninterrupted polished, curved surface comprising the front face of the lens, the rear blank having an aperture defining the boundary of the near vision field and exposing a portion of the polished inner surface of the front blank, the rear blank having an outer curved, polished surface comprising the rear face of the lens, the centers of curvature of the front and rear faces of the lens being located on the same axis, the center of curvature of the exposed portion of the rear surface of the front blank being located at a point selectively removed from said axis whereby prism power may be selectively introduced in the near vision field with the base of the prism selectively located in a predetermined position.

PAUL A. K. BOEDER.
HARRY W. HILL.
EDGAR D. TILLYER.